United States Patent [19]

Huang et al.

[11] Patent Number: 4,817,511
[45] Date of Patent: Apr. 4, 1989

[54] FOOD PRODUCT PRESS

[75] Inventors: Min N. Huang; Steven R. Lary; Claude L. McFarlane, all of Madison, Wis.

[73] Assignee: DEC International Inc., Madison, Wis.

[21] Appl. No.: 103,509

[22] Filed: Oct. 1, 1987

[51] Int. Cl.$^4$ .............................................. B30B 15/10
[52] U.S. Cl. ........................................ 99/349; 100/219
[58] Field of Search ................................... 99/349–351; 100/219, 194; 188/82.7, 82.74, 265, 67; 254/108–112

[56] References Cited

U.S. PATENT DOCUMENTS

| | | | |
|---|---|---|---|
| 837,733 | 12/1906 | Robinson | 100/219 |
| 3,618,511 | 11/1971 | Matthews | 100/194 |
| 3,750,563 | 8/1973 | Tonson | 100/219 |
| 4,341,154 | 7/1982 | Orlowski et al. | 100/194 |
| 4,658,718 | 4/1987 | Buller-Colthurst et al. | 100/194 |

FOREIGN PATENT DOCUMENTS 520285  2/1931  Fed. Rep. of Germany ...... 100/219

Primary Examiner—Henry J. Recla
Assistant Examiner—Linda J. Sholl
Attorney, Agent, or Firm—Andrus, Sceales, Starke & Sawall

[57] ABSTRACT

A food product press includes a vertically disposed array of interleaved pairs of product carrying shelves and compression shelves, between each pair of which food products, such as hams, may be compressed for processing. The product shelves are fixed and the compression shelves are movable as a group with respect thereto and may be set and held at any desired spacing or with any selected compression of the products. The press is manually operable by a single operator and is readily disassembleable for cleaning or modified use.

8 Claims, 3 Drawing Sheets

FOOD PRODUCT PRESS

BACKGROUND OF THE INVENTION

The present invention relates to an apparatus for use in processing food products where it is desired to maintain the products in compression during processing. More particularly, the invention relates to a meat processing apparatus, especially adaptable for processing hams, in which the products are held compressed between pairs of vertically adjustable shelves during the cooking or curing process.

A wide variety of devices useful for processing food products, such as hams, which are most desirably compressed during processing are known in the art. Such devices are also adapted for high volume production and, therefore, are constructed to accommodate a fairly large number of products, but in a fairly compact arrangement. It is also desirable to maintain the products in a spaced relationship, both horizontally and vertically, so that the products are uniformly and completely exposed to the processing atmosphere. The processing may, for example, comprise cooking, smoking, or other curing process.

One common prior art construction is the so-called "ham press" in which a box-like framework contains a series of vertically spaced product carrying shelves, above each of which is located a vertically adjustable compression shelf which can be moved downwardly to bear upon the hams or other products lying on product shelves and hole them in compression during processing. The shelves are most often porous plates or screens which are rigid enough to transmit the desired compressive force, but which will also provide ready access of the processing atmosphere to the food products.

The typical prior art ham press also includes means for conveying or moving it into and out of a processing chamber. One common arrangement is to simply provide the device with supporting wheels or, in an alternate construction, the device may utilize overhead rollers to adapt the press for movement along a monorail or similar conveying system.

Various arrangements for providing relative movement between the product shelves and the compression shelves in a ham press are shown in the art, as are means for varying the level of compressive force to which the hams or other products may be subjected. In U.S. Pat. No. 3,618,511 the compression shelves are biased to move toward the product shelves by the force of vertically disposed compression springs. The springs are first compressed, as through the use of an air cylinder, to force the shelves apart for loading the hams to be cooked or cured on the product shelves. Release of the force of the air cylinder after loading, causes the compression springs to force the upper compression shelves down against the hams and to compress the same therebetween. The patent also discloses the use of spacer members between opposing shelves to limit the final process spacing. However, since the force exerted by a compressed coil spring will very substantially, depending upon its state of compression (or, conversely, extension), the actual compressive load exerted by this device will depend largely upon the size of the hams or other products being processed and, indeed, the utility of this device may be rather severely restricted to a rather narrow range of product sizes.

Another prior art ham press utilizes the dead weight of the product shelves as well as the products thereon to exert a compressive force on the products contained on lower level shelves. These compressive forces may be supplemented by the active compressive force of a coil spring arrangement. However, because of the cumulative increase in dead load from top to bottom, there is a lack of uniformity of compression from one shelf to another. U.S. Pat. No. 4,341,154 discloses an individual spring-loaded compression device for each set of trays wherein the supplemental force may be decreased from top to bottom of the stack of shelf pairs, so that the combined pressure resulting from the dead weight and the auxiliary compression will be more uniform. The construction, however, is quite complex and requires individual adjustment of each of auxiliary compression means for each shelf pair.

U.S. Pat. No. 4,658,718 also discloses the use of compression springs to press a unitary assembly of compression shelves against an interposed assembly of product shelves. The length of the compression springs is adjustable to vary the amount of compressive force exerted. However, no provision is made for shelf to shelf dead weight compensation.

Thus, the prior art is characterized by devices which utilize dead weight compression and/or spring-loaded compression which, in many prior art devices, may vary considerably from shelf to shelf in a vertical direction. In addition, it is difficult to control initial product size as the products are loaded onto the press and, as a result, both initial and final compression, as well as final product size, may vary from shelf to shelf and also on the same shelf.

SUMMARY OF THE INVENTION

In the present invention, a single, uniform compressive load is applied through a mechanical lever arm arrangement to a unitary arrangement of upper press shelves to cause them to engage the products supported on interposed rigidly supported product shelves. Once the initial level of compression is reached, the relative product-press shelf space is locked and that spacing is maintained throughout the processing.

It has been found that, particularly in the processing of hams, by establishing an adequate initial compression level, product shrinkage during processing is relatively minimal. Locking the shelves at the spacing established by the initial level of compression and holding that spacing fixed during the processing helps maintain consistent product size, both across the shelves and from shelf to shelf. The actual compressive force used may be varied over a wide range or may be the size of products processed.

The ham press apparatus of the present invention can be added by modification to a standard meat truck without structurally altering the latter. Both sets of shelves are removable for ease of cleaning and, when not used as a ham press, the apparatus is easily reconfigured for use as a standard meat truck.

DETAILED DESCRIPTION OF THE PREFERRED EMBODIMENT

Figure 1:
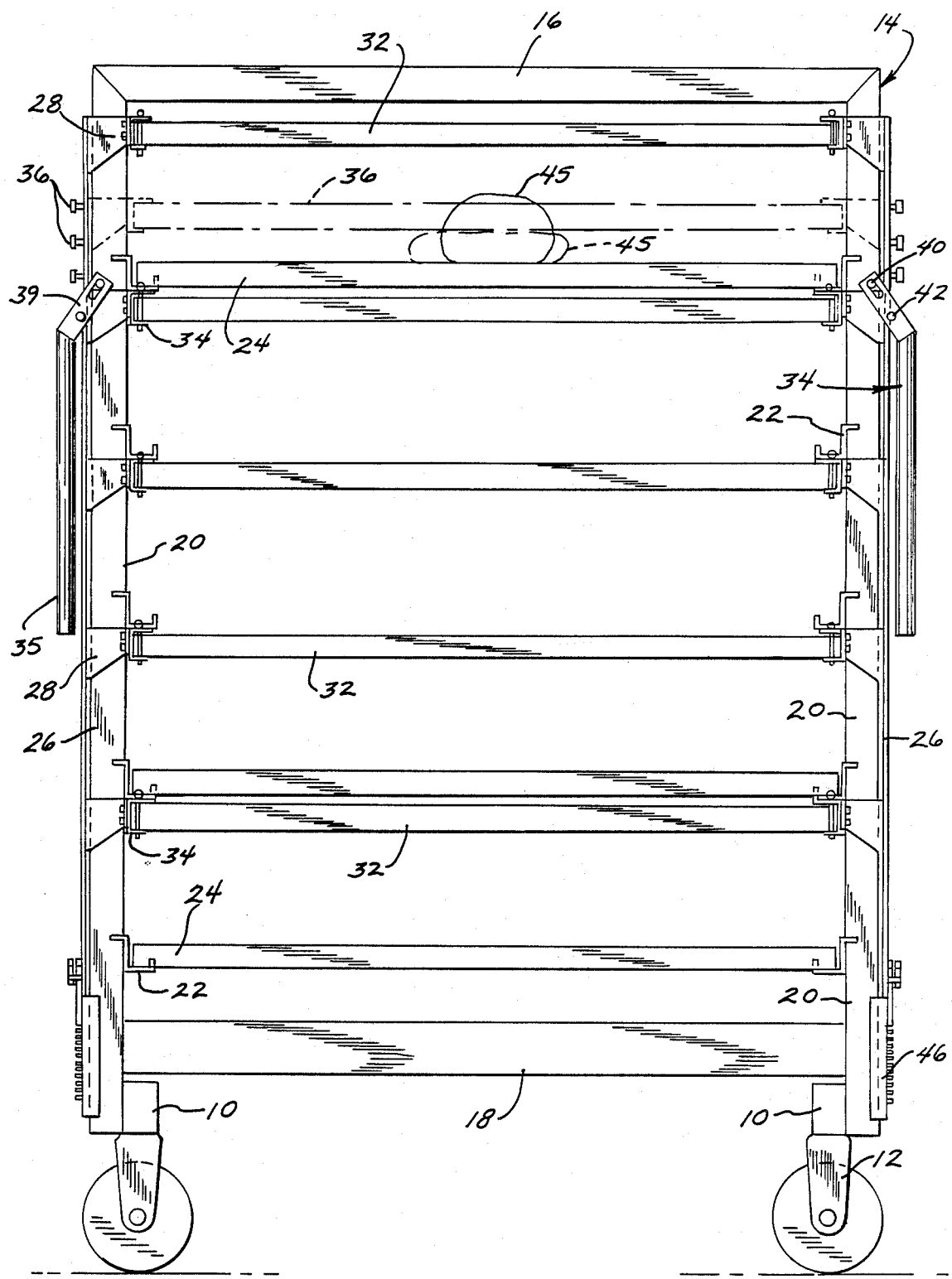
FIG. 1 is a side elevation of a standard meat truck modified to include the ham press apparatus of the present invention.
Figure 2:
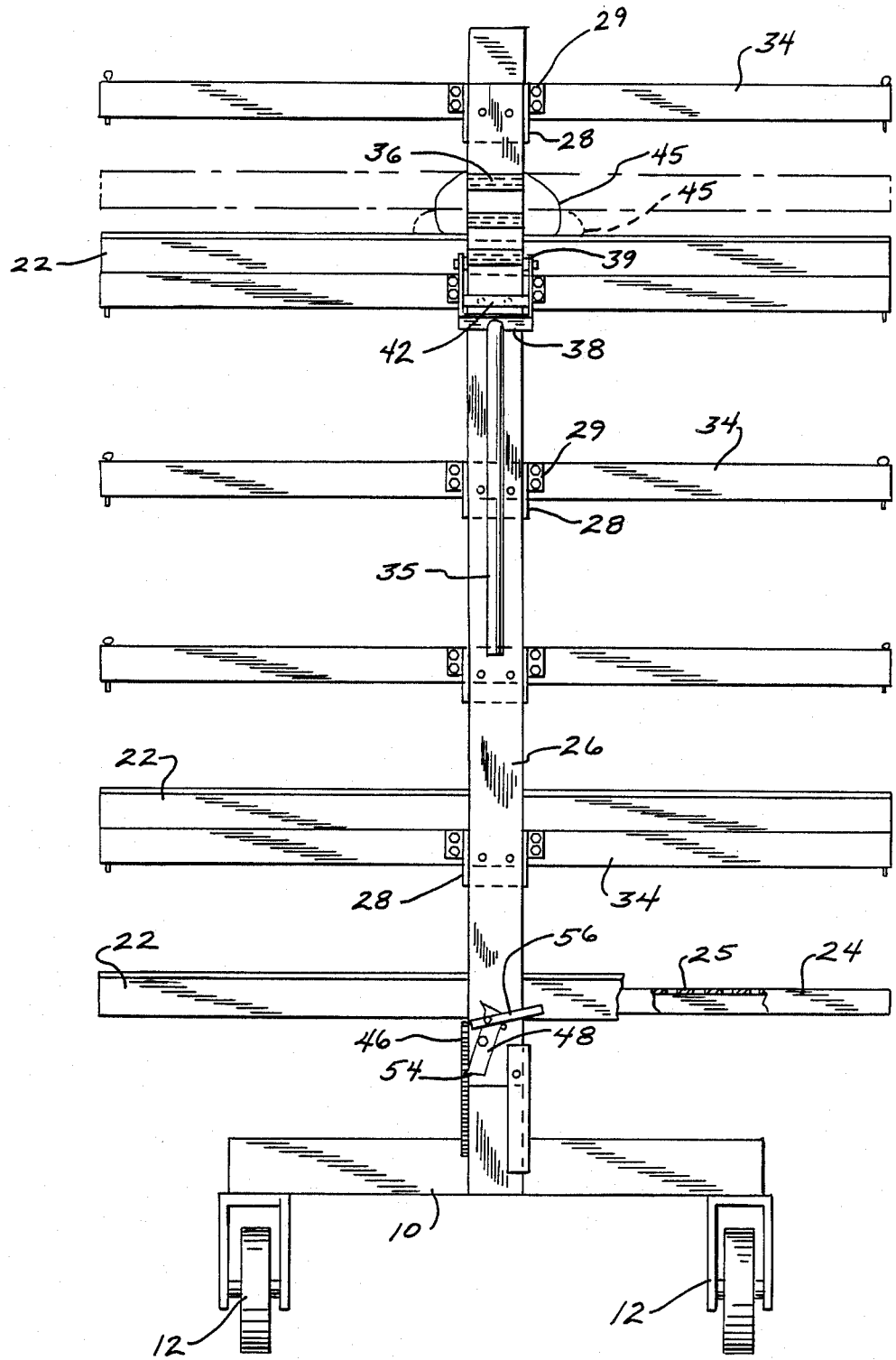
FIG. 2 is an end elevation of the truck and press apparatus shown in FIG. 1 showing relative operative engagement.

Referring particularly to FIGS. 1 and 2, the basic supporting structure for the apparatus of the present invention is a conventional meat truck. The truck includes a pair of axle members 10 each carrying a pair of castered support wheels 12. A rectangular support frame 14 is centrally mounted between the axle members and includes upper and lower cross supports 16 and 18 and vertical side supports 20. The various components of the support frame 14 are conventionally of tubular construction having a rectangular cross section, but other structural shapes may be used as well.

A series of horizontally disposed shelf arms 22 are attached in a fixed and rigid position to each side support 20. When used as a standard meat truck, the apparatus as above described may be used to support sausages or similar meat products suspended from poles (not shown) extending between oppositely disposed shelf arms 22. Alternately, rigid product shelves 24 in the form of shallow pans or screens may be demountably placed upon and extend between opposite shelf arms 22. The product shelves 24 typically include a foraminous or open mesh surface 25 to facilitate the passage of the process air or atmosphere over the food products placed thereon.

The ham press device, to be described in detail hereinafter, comprises identical compression and locking structures mounted for adjustable vertical movement to each side support 20. Thus, the structure will be described with respect to one side of the press with the other side being constructed and operating identically.

A slide plate 26 is attached for vertical reciprocable movement along the side support 20 by a series of vertically spaced slide plates supports 28. The slide plate supports are U-shaped and horizontally disposed to surround the side support 20 on three sides and open toward the inside thereof. The legs of each slide plate support include flanges 29 to which are attached a channel member 34 for supporting one edge of a press shelf 32. Each U-shaped slide plate support 28 with its attached channel member 30 surrounds, but is slightly spaced from, the side support 20. In addition, the slide plate supports are attached to the slide plate 26 above and at the same spacing relative to each adjacent product shelf arm 22 such that, regardless of the vertical movement of the slide plate with respect to the side support, each press shelf 32 will always be spaced from its associated product shelf 24 by the same distance.

Relative movement between the slide plate 26 and side support 20 (and hence corresponding movement between press shelves 32 and product shelves 24 for compressing hams or other food products therebetween) is effected manually through the use of a compression lever 34, pivotally attached to the side support, via its engagement with vertically spaced abutments 36 on the slide plate. The compression lever 34 includes a lever bar 35 and an angularly offset bifurcated end 38, the legs 39 of which span the side support 20 and are pivotally attached thereto by a pivot pin 40. The bifurcated end 38 also includes a bearing pin 42 extending between the legs 39 spaced from and parallel to the pivot pin 40. Attached to the outer face of the slide plate 26 are a series of vertically spaced abutments 36, each of which is in the shape of a small T-section and extends across the full width of the slide plate 26.

Figure 3:
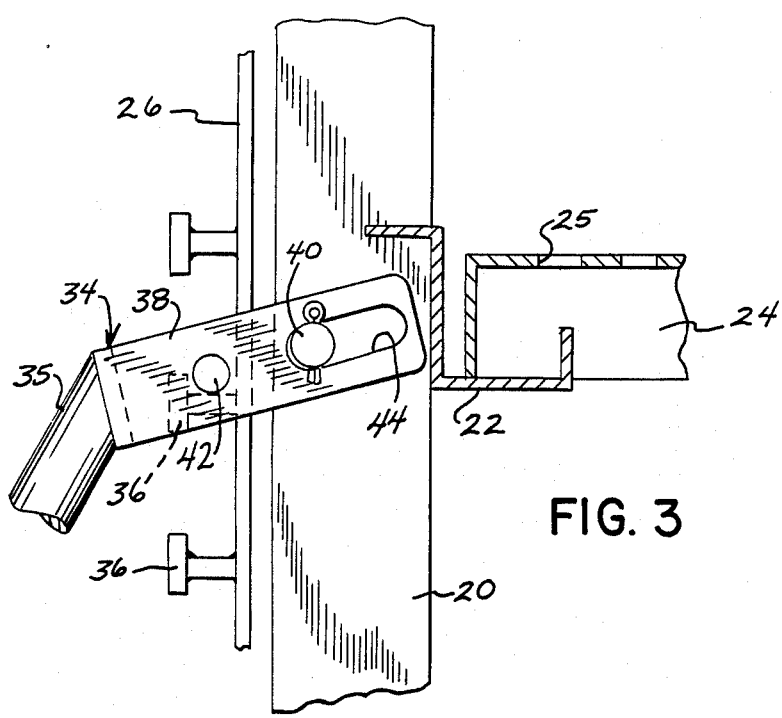
FIG. 3 is a detailed view of the compression apparatus shown in FIG. 1.

As the compression lever 34 is raised from its at rest position shown in FIG. 1 by pivoting it in a vertical plane about pivot pin 40, the bearing pin 42 may be brought into engagement with the upper surface of an abutment 36, as shown in FIG. 3. To facilitate proper engagement of the abutment by the bearing pin, the legs 39 of the bifurcated end 38 of the compression lever are provided with slots 44 at the connection with pivot pin 40. Downward movement of the compression lever 34 from its position in FIG. 3 will cause downward movement of the slide plate 26 with respect to the side support 20 and consequent movement of the press shelves 32 toward the product shelves 24. Referring particularly to FIG. 1, after initial engagement of the upper press shelf 32 with a ham 45 or other food product resting on the product shelf 24, the operator simply exerts further downward force on the compression lever 34 until a desired level of compression and/or desired final thickness of the ham 45 is attained.

Simultaneously with operation of the compression mechanism, a locking mechanism is operable to secure the shelves 24 and 32 at the selected spacing and maintain the size to which the hams 45 are compressed. The locking mechanism also functions to lock and hold the shelves in an open spaced position, as will be described hereinafter.

A square-toothed rack 46 is attached to the lower end of side support 20 such that its tooth pattern is vertically disposed. A locking detent 48 is rotatably attached to the slide plate 26 near its lower end for pivotal movement about detent pivot 50 into and out of engagement with the rack 46. The detent includes an upper tooth 52 for locking the press in its closed position with the products compressed between adjacent shelves, and a lower tooth 54 for locking the press in its open position with the shelves spaced apart and no engagement between the press shelves 32 and any products resting on the product shelves 24.

Detent 48 includes a counterbalance bar 56 pivotally attached near the top of the detent by counterbalance pivot 58. A stop pin 60 attached to and extending perpendicularly from the plane of detent 48 holds the counterbalance pivot 58 in a first position (as shown in FIG. 2) wherein the lower tooth 54 is biased into contact with the rack 46. In this position, upward movement of the slide plate 26 along the side support 20 (by lifting the lever arm 35 with the bearing pin 42 in engagement with the underside of an abutment 36), will cause the lower tooth 54 of the detent to ratchet upwardly along the rack 46 until the desired open position is attained, whereby release of the lifting force on the lever arm 35 will result in bearing engagement of detent tooth 54 with the tooth on the rack immediately below it.

Figure 4:
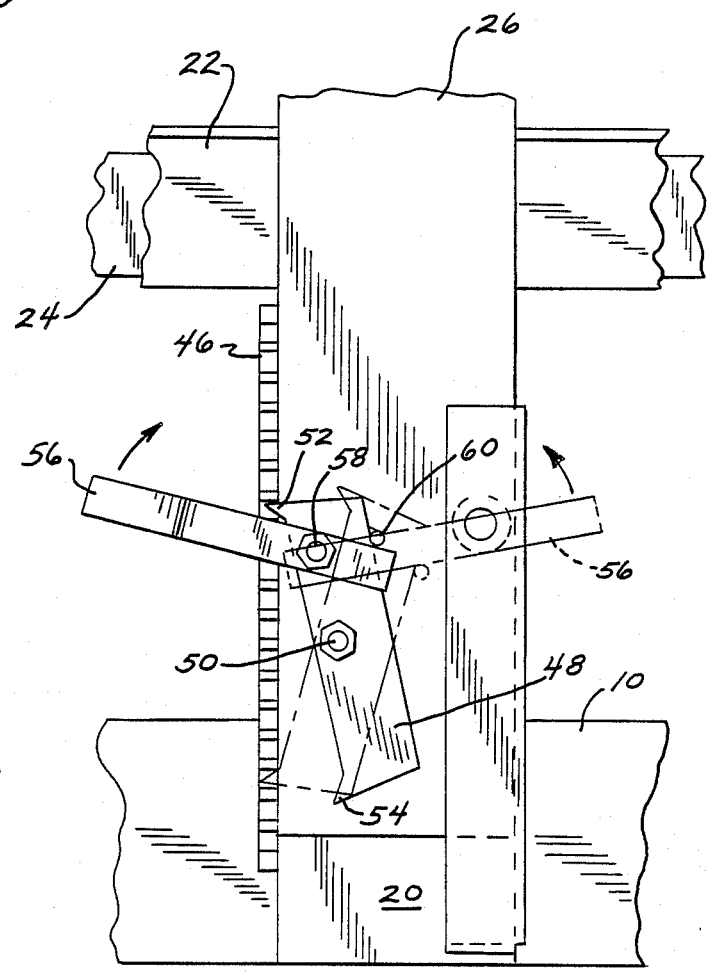
FIG. 4 is a detailed view of the locking mechanism shown in FIG. 2 in its alternate locked position.

When it is desired to lower the press shelves and compress hams, counterbalance bar 56 is manually moved to the position shown in FIG. 4 and a slight upward lifting force on the lever arm 35 will cause the lower tooth 54 to disengage from the rack and the detent to pivot to the solid line position shown in FIG. 4. The slide plate 26 and attached press shelves 32 are lowered until the latter contact the tops of the hams on the product shelves. As the shelves are lowered, upper tooth 52 of the detent 48 will ratchet along the rack 46 in a downward direction relative thereto. After the press shelves engage the products carried on the shelves, downward force must be exerted on the lever arm to effect compression of the hams. During compressive movement, the upper tooth 52 of detent 48 will continue to ratchet downwardly along the rack 46 and, when the operator releases the lever arm, the upper tooth 52 will engage and lock into contact with the undersurface of the rack tooth immediately above it. When it is desired to open the press after processing, the counterbalance pivot 58 is moved clockwise to the dotted line position of FIG. 2 and a slight downward force on the lever arm 35 will cause the detent 48 to pivot in a clockwise direction and upper tooth 52 to disengage from the rack 46.

As previously mentioned, the ham press of the present invention includes identical compression and locking mechanisms on opposite sides of the meat truck. Obviously, two operators could simultaneously operate the press from opposite sides. However, the press is constructed to be operated by a single operator and with a minimum of movement required from one side of the apparatus to the other. When operated by one person, the operator simply sets one side to the desired shelf spacing and product compression, and moves to the other side and establishes similar settings. As the first side is set, the press shelves 32, which are loosely pinned in the channel members 30, are simply canted upwardly until the opposite side can be adjusted and set.

The hand press described herein is simple in construction, yet very effective in setting and maintaining fixed spacing between the shelves, and therefore, a fixed final product thickness. The apparatus requires no auxiliary equipment, such as an air cylinder, to separate the shelves for loading, or a supplemental source of a compressive force, such as the compression springs typical of the prior art. Further, the apparatus of the present invention is capable of applying uniform compression to sizes of food products varying over the full range of shelf adjustability. Also, the shelves are readily demountable for cleaning and storage, and the basic meat truck can be used for other purposes or easily nested for storage.

Various modes of carrying out the invention are contemplated as being within the scope of the following claims particularly pointing out and distinctly claiming the subject matter which is regarded as the invention.

We claim:

1. In a food product press having a rigid supporting framework adapted to be supported from below including oppositely disposed vertical side supports, vertically spaced horizontal product shelves attached to and extending between the side supports, and vertically spaced horizontal press shelves disposed between the product shelves and movable vertically with respect to the side supports and product shelves to compress food products between adjacent product and press shelves, an improved apparatus for effecting and maintaining product compression comprising:
   (a) unitary slide plates movably attached to opposite vertical side supports and reciprocable vertically with respect thereto;
   (b) press shelf support means on the slide plates for holding each press shelf by its opposite edges such that the press shelves move vertically in unison with the slide plates;
   (c) compression means operatively interconnecting the side supports and slide plates for establishing a selectively variable uniform spacing between adjacent product and press shelves and initial compression of the food products; and
   (d) locking means for maintaining the spacing between adjacent product and press shelves established by said compression means.

2. The apparatus as set forth in claim 1 wherein the product shelves and the press shelves are demountably attached to the side supports and slide plates, respectively.

3. The apparatus as set forth in claim 1 including horizontal shelf arms attached to the side supports for effecting attachment of the product shelves thereto.

4. The apparatus as set forth in claim 3 wherein the press shelf support means comprises a pair of channel members for each press shelf disposed to slidably receive the opposite edges of a press shelf.

5. The apparatus as set forth in claim 4 wherein the product shelves and the press shelves comprise foraminous metal pans.

6. The apparatus as set forth in claim 1 wherein the compression means comprises:
   (a) a compression lever arm pivotally attached to the vertical side support for movement in a vertical plate; and
   (b) spaced abutments on the slide plate engageable by the lever arm to cause relative movement between the slide plate and the side support in response to movement of the lever arm.

7. The apparatus as set forth in claim 6 wherein the locking means comprises:
   (a) a toothed rack attached to the side support and having a vertically disposed tooth pattern; and,
   (b) a movable detent on the slide plate adapted to be biased into engagement with a tooth of the rack in response to operation of the compression means to hold the relative position established between the slide plate and side support by the compression means.

8. The apparatus as set forth in claim 7 wherein the compression means is manually operable.

* * * * *